United States Patent
Mongeon

(10) Patent No.: US 7,420,719 B2
(45) Date of Patent: Sep. 2, 2008

(54) SKEW CORRECTION

(75) Inventor: Michael C. Mongeon, Walworth, NY (US)

(73) Assignee: Xerox Corporation, Norwalk, CT (US)

(*) Notice: Subject to any disclaimer, the term of this patent is extended or adjusted under 35 U.S.C. 154(b) by 671 days.

(21) Appl. No.: 11/172,111

(22) Filed: Jun. 30, 2005

(65) Prior Publication Data
US 2007/0002404 A1 Jan. 4, 2007

(51) Int. Cl.
H04N 1/46 (2006.01)

(52) U.S. Cl. .................. 358/504; 358/406; 382/287; 382/289; 399/9; 399/15

(58) Field of Classification Search .............. 358/1.18, 358/296, 300, 406, 448, 496, 497, 504; 382/151, 382/287, 289, 291, 293, 294; 399/9, 15, 399/16, 11, 301, 401; 347/19, 37, 116, 138, 347/234, 248

See application file for complete search history.

(56) References Cited

U.S. PATENT DOCUMENTS

| 4,627,721 | A | | 12/1986 | Nguyen et al. |
| 5,374,993 | A | * | 12/1994 | Diehl et al. ................. 399/9 |
| 5,642,202 | A | | 6/1997 | Williams |
| 5,821,971 | A | | 10/1998 | Rauch et al. |
| 5,889,545 | A | | 3/1999 | Rauch et al. |
| 6,137,517 | A | | 10/2000 | Furst et al. |
| 6,141,464 | A | | 10/2000 | Handley |
| 6,178,031 | B1 | | 1/2001 | Rauch et al. |
| 6,275,244 | B1 | | 8/2001 | Omelchenkow et al. |
| 6,404,517 | B1 | * | 6/2002 | Chao .......................... 399/9 |
| 6,415,064 | B1 | * | 7/2002 | Oh ........................... 358/448 |
| 6,529,616 | B1 | * | 3/2003 | Rasmussen et al. ......... 358/504 |
| 6,942,312 | B2 | * | 9/2005 | Leung et al. ................. 347/19 |
| 7,006,246 | B1 | * | 2/2006 | Nakajima ................... 358/1.9 |
| 2002/0110380 | A1 | * | 8/2002 | McIntyre ...................... 399/9 |
| 2003/0024792 | A1 | * | 2/2003 | Yoshida et al. ............. 382/113 |
| 2003/0128401 | A1 | * | 7/2003 | Conrow et al. ............. 358/300 |
| 2003/0133000 | A1 | * | 7/2003 | Conrow et al. ............. 347/116 |
| 2005/0012771 | A1 | * | 1/2005 | Leung et al. ................. 347/19 |
| 2005/0219652 | A1 | * | 10/2005 | Park ......................... 358/1.18 |
| 2005/0271296 | A1 | * | 12/2005 | Tsuji et al. ................. 382/289 |
| 2006/0017802 | A1 | * | 1/2006 | Yoo et al. ................... 347/248 |
| 2008/0006992 | A1 | * | 1/2008 | Inoue ........................ 271/228 |

\* cited by examiner

Primary Examiner—Kimberly A Williams
(74) Attorney, Agent, or Firm—Gibb & Rahman, LLC

(57) ABSTRACT

Method embodiments herein print a test document using a multi-function printing device to produce a printed document. This printed document is examined in a first direction to determine a first skew of the printing device. The first skew comprises a combination of raster output scanner skew and media path skew. The printed document is also examined in a second direction to determine a second skew. However, this second skew only includes the media path skew of the printing device. Once these two skews are acquired, the method can subtract the media path skew from the first skew to calculate the raster output scanner skew of the printing device.

10 Claims, 4 Drawing Sheets

SKEW CORRECTION

BACKGROUND

Embodiments herein generally relate to skew correction performed in multi function printing/copying devices. "Skew" refers to an accidental, usually slight, rotation of an image that occurs due to rotation of an image bearing substrate relative to a device such as a scan head. Most document feeders in scanners and copiers, especially high-speed document feeders, are susceptible to at least some degree of skew. Skew results in an image that is slightly rotated, compared to the original image. Thus, a slightly rotated image is subsequently output by being printed on a substrate, displayed on a screen, and/or the like.

In various reproduction systems, including Xerographic printing systems, the control and registration of the position of imageable surfaces such as photoreceptor belts, intermediate transfer belts, if any, and/or images on such imageable surfaces, and the control and registration of images transferred to and developed on a substrate, such as for example, a sheet of paper, involve both initial and process control methods.

To adjust the registration of images on either or both axes, i.e., the lateral axis and/or the process direction axis, relative to the image bearing surface and to one another, includes adjusting the position or timing of the images being formed on the image bearing surface. That may be done, for example, by controlling the raster output scanner (ROS) imaging system or of any other included latent or visible image forming systems.

Various systems and methods have been developed to control registration of image on paper after an initial registration has been made. Examples of such registration systems include those shown and described in U.S. Pat. Nos. 5,821, 971; 5,889,545; 6,137,517; 6,141,464; 6,178,031; and 6,275, 244, the subject matter of each patent incorporated herein by reference in its entirety. For example, U.S. Pat. No. 5,642, 202, the subject matter of which is incorporated herein by reference in its entirety, discloses a process for initial registration calibration of a printing system including a printer and a master test image document printed by the printer.

There are a number of sources of image on sheet (IOS) or image on paper (IOP) registration errors which may be addressed, including process magnification, lateral magnification, lateral margin shifts, process margin shifts, paper skew and/or imager skew. Process magnification is the magnification of the image in the process direction, i.e., the direction in which the substrate onto which the image is transferred and developed moves through the image transfer and developing apparatus. Lateral magnification is the magnification of the image in the lateral direction, i.e., in the direction substantially perpendicular to the process direction. Paper skew is the angular deviation of the longitudinal axis of the substrate in the process direction and/or the angular deviation of the lateral axis of the substrate perpendicular to the process direction. Imager skew is the angular deviation of the raster output scanner scan lines from the process direction or a line normal to the process direction.

The lateral margins are the spaces between each edge of the image transferred to and developed on the substrate and each adjacent edge of the substrate which is substantially parallel to the process direction. The process margins are the spaces between each edge of the image transferred to and developed on the substrate and each adjacent edge of the substrate which is substantially perpendicular to the process direction. It should be noted that, in many Xerographic image forming devices, each image is exposed successively by one or more raster output scanner imagers. Each raster output scanner has a start of scan (SOS) sensor and an end of scan (EOS) sensor. These sensors, i.e., the start of scan (SOS) and end of scan (EOS) sensors, along with the delay before the first pixel is imaged after the start of scan occurs, and the associated timing of when the start of scan occurs, establish the lateral and process margins of a latent image which is to be developed and transferred to a substrate.

Because the effects of these possible image on sheet or image on paper registration errors are interrelated, conventional image on sheet or image on paper setup/calibration procedures first requires correcting for any paper skew and imager skew errors, then correcting for any lateral and process magnification errors, and then correcting for any lateral and process margin errors.

Each correction step may involve multiple iterations of printing and measuring test images and adjusting imaging system parameters before registration error magnitudes are reduced to acceptable levels. U.S. Pat. No. 4,627,721, the subject matter of which is incorporated herein by reference in its entirety, discloses automatic adjustment of optical components in an optical scanning system after a technical representative has visually inspected sample copies of a test pattern and entered adjustment numbers at a control console. In one specific embodiment, one sample copy is compared by the technical representative with the test pattern to adjust the magnification setting and a sequence of a set of five copies are produced to allow coarse and fine adjustments to the focus. U.S. Patent Publication 2003/0133000, incorporated herein by reference, discloses a system that uses an initial set of measurements to determine and reduce each of a number of images on paper registration errors in a single operator step.

U.S. Patent Publication 2003/0128401, incorporated herein by reference, discloses a method of correcting output image squareness in a laser printer system having a Raster Output Scanning (ROS) device with a pivotal mounting. The method includes printing a test pattern that includes a plurality of markers printed in a predetermined geometric arrangement and calculating a skew angle based on the measured distances, preferably using the Law of Cosines. The ROS device is then automatically rotated by an amount sufficient to correct the skew angle. The ROS rotation is performed automatically by an adjustment system connected to the ROS. The method optionally includes a scanner for scanning the test pattern image and making the measurements automatically via a program configured to analyze the scanned image.

SUMMARY

Method embodiments herein print a test document using a multi-function printing device. This printed document is examined in a first direction that is across (perpendicular to) the processing direction of the printed document (the direction in which the paper travels through the printer) to determine a first skew of the printing device. The first skew comprises a combination of raster output scanner skew and media path skew because both types of skew will contribute to the skew that occurs across the processing direction. The printed document is also examined in a second direction parallel to the processing direction to determine a second skew. However, this second skew only comprises the media path skew of the printing device because the raster output scanner will not produce skew in the direction parallel to the direction of the paper path. The raster output scanner is positioned across the paper as it travels through the printer. Therefore, each mark produced by one region of the raster output scanner will naturally be aligned with marks that are produced by the same region of the raster output scanner as the paper moves past the raster output scanner. The only type of skew that can occur in the paper travel direction results from the misalignment of the paper path itself. Once these two skews are acquired, the method can subtract the media path skew from the first skew to calculate the raster output scanner skew of the printing device.

In addition, the method can copy the test document from the platen of the printing device to produce a platen copy of the document. The platen copy is similarly examined across the processing direction to determine a third skew of the printing device. This third skew comprises a combination of raster output scanner skew, media path skew, and scanner image bar skew. Once the third skew is found, the first skew can be subtracted from the third skew to calculate the scanner image bar skew of the printing device. In a similar manner, the test document can be copied from the document handler of the printing device to produce a document handler copy of the document. The document handler copy is also examined across the processing direction to determine a fourth skew of the printing device, wherein the fourth skew comprises a combination of raster output scanner skew, media path skew, scanner image bar skew, and document handler skew. Thus, once the fourth skew is found, the third skew can be subtracted from the fourth skew to calculate the document handler skew of the printing device.

The method employs common algorithms to perform image rotation corrections to compensate for the raster output scanner skew, the media path skew, the scanner image bar skew, and the document handler skew, when printing images with the printing device. However, with embodiments herein different skew corrections are performed depending upon the type of printing operation being performed by the printing device. In other words, a different skew correction will be performed depending upon whether the multi-function printing device is printing, copying from the platen, or copying from the document handler.

The test document has markings indicating a vertical and horizontal alignment of the document (e.g., alignment along the X and Y axis). Thus, examining of the printed document, the platen copy document, and/or the document handler copy of the document comprises scanning each of the respective documents, and comparing positions of the markings on the documents.

These and other features are described in, or are apparent from, the following detailed description.

BRIEF DESCRIPTION OF THE DRAWINGS

Various exemplary embodiments of the systems and methods described in detail below, with reference to the attached drawing figures, in which.

DETAILED DESCRIPTION

Figure 1:
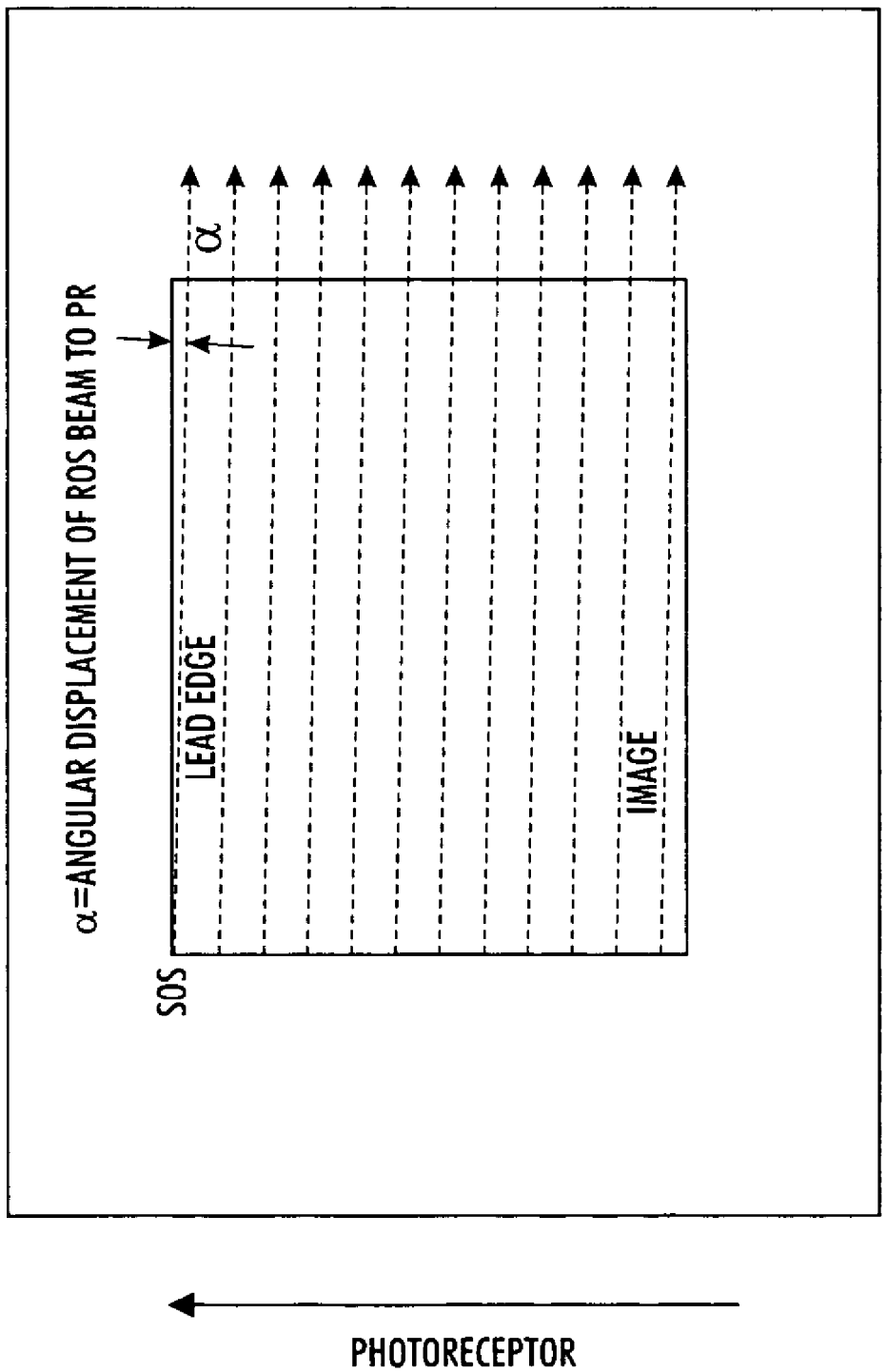
FIG. 1 is a schematic representation of skew produced by a printing device.

As mentioned above, Image On Paper (IOP) skew is a geometric property of image quality that is important to the user of a copier/printer. Multi-function devices, such as Xerographic printers/copiers can perform many functions including printing, copying, faxing, scanning, etc. Printers, copies, and multi-function devices may exhibit image to paper skew due to several sources such as ROS mounting and normality to photoreceptor, simplex paper path presentation of substrate to latent image, input scanner capture normality to original, duplex paper path presentation of substrate to latent image, document handler positioning of original, etc. For example, FIG. 1 is an illustration of ROS beam to photoreceptor skew angle, $\alpha$, caused by either module mounting, or ROS beam bow or smile (optics).

Figure 2:
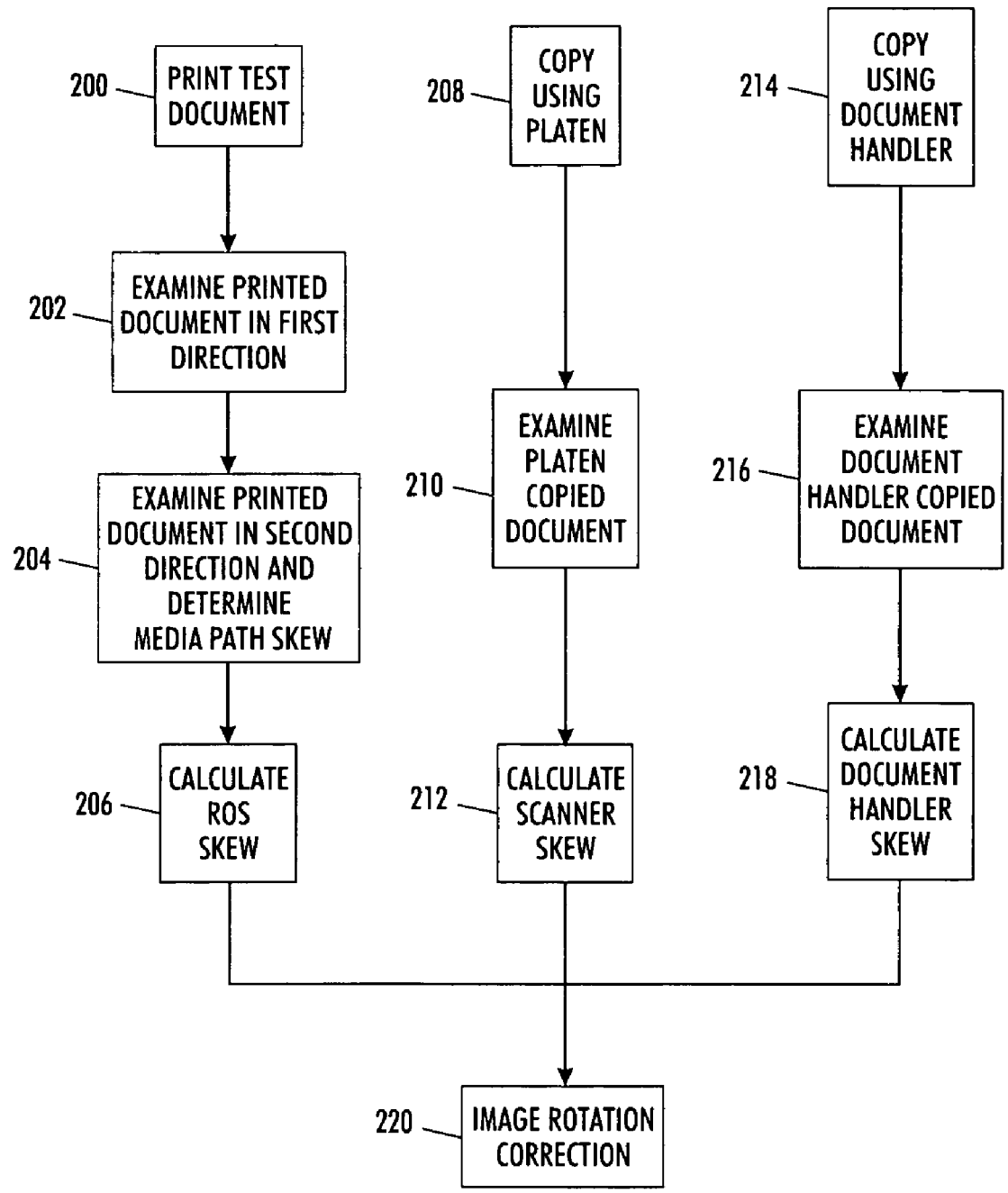
FIG. 2 is a flow diagram illustrating method embodiments herein.

In order to address these skew issues, embodiments herein set forth various methods, such as the one illustrated in flowchart form in FIG. 2. More specifically, in item 200 in FIG. 2, a test document having alignment markings is printed using the multi-function printing device. This produces what is herein sometimes referred to as a "printed document." This printed document is examined in item 202 in a first direction that is across (perpendicular to) the processing direction of the printed document (the direction in which the paper travels through the printer) to determine a "first" skew of the printing device. This first skew results from a combination of the raster output scanner (ROS) skew and media path (paper path) skew. The printed document is also examined in a second direction that is (parallel to) the processing direction to determine a "second" skew in item 204. However, this second skew found in item 204 only includes the media path skew of the printing device. The first direction is perpendicular to the second direction. Once these two skews are acquired, the method can subtract the media path skew from the first skew to calculate the raster output scanner skew of the printing device in item 206.

The first skew comprises a combination of raster output scanner skew and media path skew because both types of skew will contribute to the skew that occurs across the processing direction. The second skew only comprises the media path skew of the printing device because the raster output scanner will not produce skew in the direction parallel to the direction of the paper path. The raster output scanner is positioned across the paper as it travels through the printer. Therefore, each mark produced by one region of the raster output scanner will naturally be aligned with marks that are produced by the same region of the raster output scanner as the paper moves past the raster output scanner. The only type of skew that can occur in the paper travel direction results from the misalignment of the paper path itself. Thus, the second skew which is measured in the processing direction only measures the skew caused by the paper path. Once these two skews are acquired, the method can subtract the media path skew from the first skew to isolate the raster output scanner skew of the printing device.

In addition, in item 208 the method can copy the test document from the platen of the printing device to produce what is sometimes referred to herein as a "platen copy" of the document. The platen copy is similarly examined across the processing direction to determine a third skew of the printing device in item 210. This third skew comprises a combination of raster output scanner skew, media path skew, and scanner image bar skew. Once the third skew is found, the first skew can be subtracted from the third skew to calculate the scanner image bar skew of the printing device (item 212). In a similar manner, in item 214 the test document can be copied from the document handler (duplex automatic document handler (DADH)) of the printing device to produce what is sometimes referred to herein as a "document handler copy" of the document. The document handler copy is also examined across the processing direction in item 216 to determine a fourth skew of the printing device, wherein the fourth skew comprises a combination of raster output scanner skew, media path skew, scanner image bar skew, and document handler skew. Thus, once the fourth skew is found, the third skew can be subtracted from the fourth skew to calculate the document handler skew of the printing device in item 218. These examination and printing processes can be performed in any order, with some steps being executed either simultaneously or in sequence with the other steps.

The method employs common algorithms to perform image rotation corrections in item 220 to compensate for the raster output scanner skew, the media path skew, the scanner image bar skew, and the document handler skew, when printing images with the printing device (e.g., see FIG. 6, discussed below). Further, different skew corrections are performed depending upon a type of printing operation being performed by the printing device. In other words, a different skew correction will be performed depending upon whether the multi-function printing device is printing, copying from the platen, or copying from the document handler.

Figure 3:
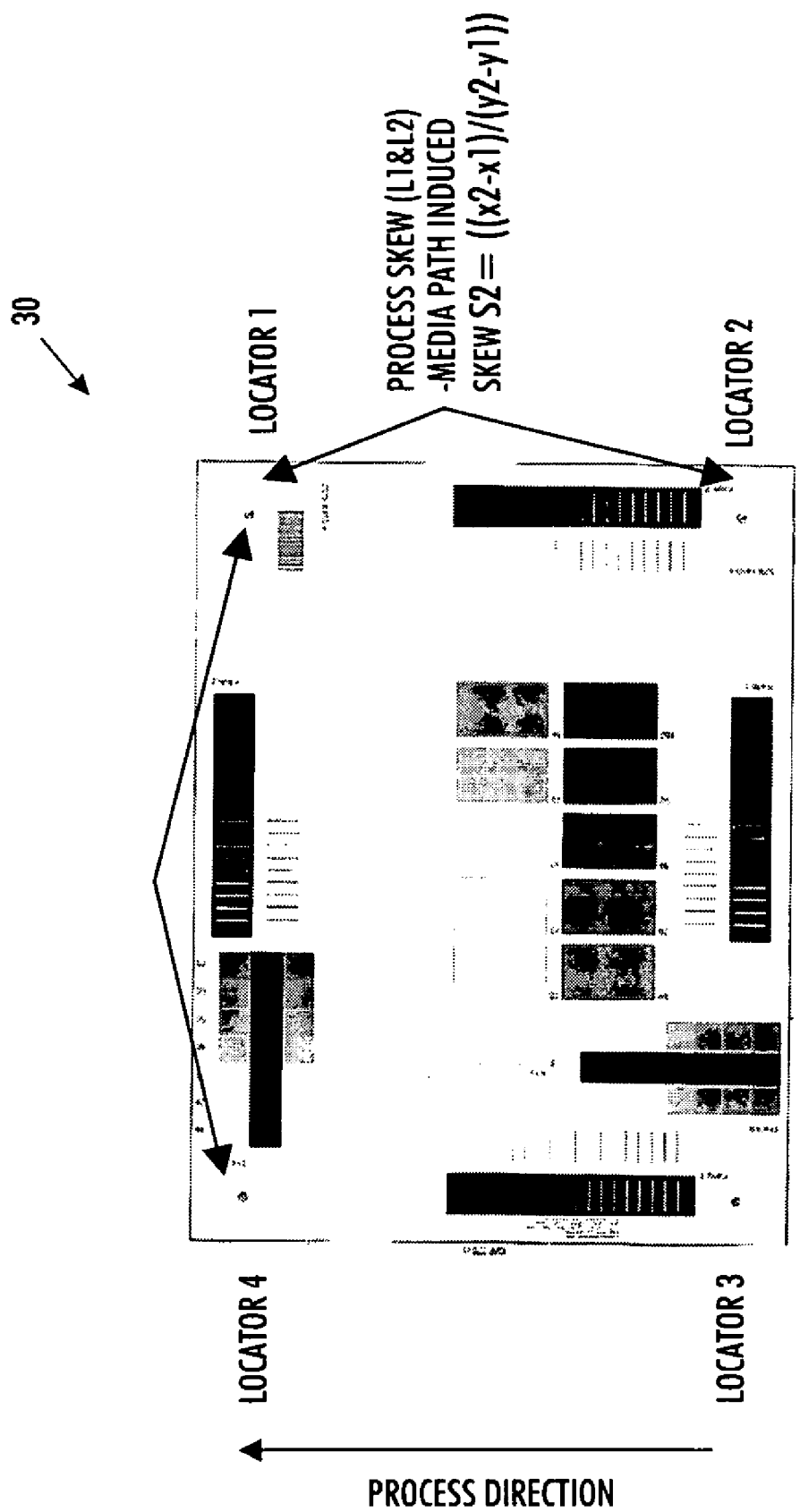
FIG. 3 is a schematic representation of a test page according to embodiments herein.

As shown in FIG. 3, the test document 30 has alignment markings (Locators 1-4; L1-L4) indicating a vertical and horizontal alignment of the document (e.g., alignment along the X and Y axis). FIG. 3 also indicates the processing direction which indicates the direction in which the paper (media) travels through the printing device. When examining the printed document, the printed document, the platen copy document, and/or the document handler copy of the document (items 204, 208, 214, and 220) the method scans each of the respective documents, and compares positions of markings on the documents with positions of markings on the test document.

Many methods can be used to determine the amount of skew the printed or copied document will show with respect to the original and one example of skew measurement is given below. While one example is discussed below, one ordinarily skilled in the art would understand that many other methods could be utilized to measure skew. In this example, the markings L1-L4 are placed on the test document 30 in known locations, the same distance from each edge of the page. Thus, in the absence of any skew, the alignment markings are perfectly aligned horizontally or vertically with the next adjacent alignment mark.

In this example, the first skew, S1, is determined between markings L1 & L4 because these markings are positioned across (perpendicular to) the processing direction. In other words, skew occurring along the line between markings L1 & L4 occurs across the processing direction. This skew S1 is the "cross process direction skew" and, as discussed above, is caused by a combination of ROS skew and paper path skew. For example, the machine default setting can be letter-sized long-edge fed substrate and the mark (L1-L4) locations (X,Y) are measured relative to substrate top-left edge. Thus, the X distance from the top-left edge of the page of mark L1 is X1 and the Y distance from the top-left edge of the page of mark L1 is Y1. The other marks use the same nomenclature. The first skew S1 may be calculated as follows: S1 (in radians)= $(Y4-Y1)/(X4-X1)$. Then, as discussed above, the method determines the second skew, S2, between L1 & L2. The second skew S2 may similarly be calculated as follows: S2 (in radians)= $(X2-X1)/(Y2-Y1)$. The third and fourth skews are determined similarly as the first skew, using L1 and L4 to find the skew in the cross process direction. One ordinarily skilled in the art would understand that many other methods and types of test pages could be used with equal success, and the foregoing is a non-limiting example intended to illustrate one manner in which embodiments herein can operate.

The skew associated solely with the ROS can be isolated by subtracting the second skew S2 (which is based only on the paper path skew) from the first skew S1 which is a combination of ROS skew and paper path skew. More specifically, the calculation for finding the ROS component of skew is S (ROS)=S1−S2. Similarly, the skew for the scanner image bar can be calculated using the equation S (Scanner)=S3−S1 and the DADH component of skew can be calculated as follows S (DADH)=S4−S3. These individual skew components can be stored in non-volatile memory (NVM) so that they can be accessed whenever skew correction is needed. These skew calculations can be performed at the time of manufacturing or in the field.

As mentioned above, correction algorithms are used to perform image rotation corrections. However, one aspect of embodiments herein is that, because separate measures of ROS, scanner, and DADH skews are isolated and maintained, the skew correction is tailored to the type of printing or copying operation being currently performed. Therefore, a different skew correction can be performed depending upon whether the multi-function printing device is printing, copying from the platen, or copying from the document handler.

Figure 4:
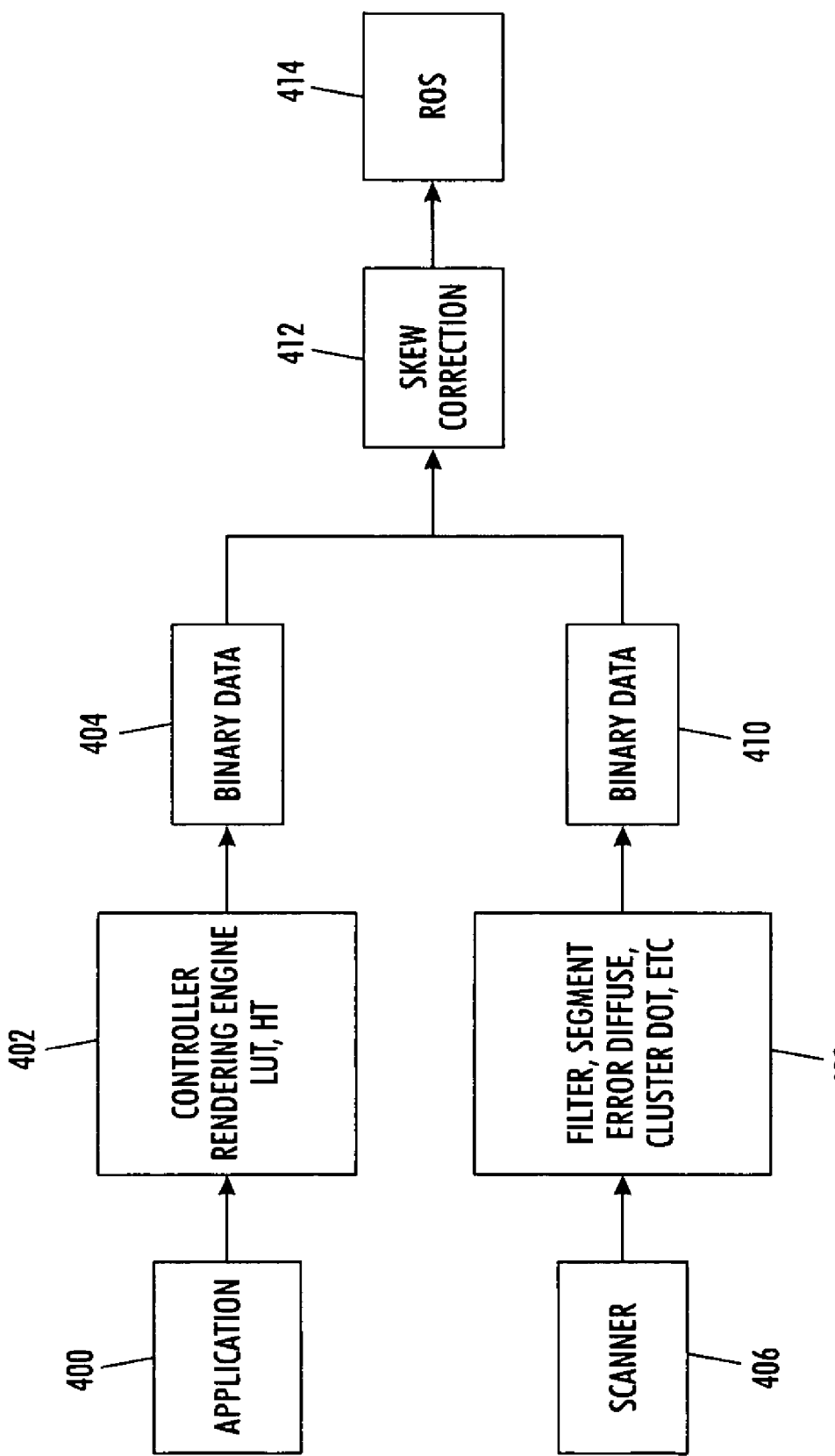
FIG. 4 is a schematic representation of a multi-function printing device.

As shown in FIG. 4, the skew correction changes the data in the image path before it is sent to the ROS. More specifically, FIG. 4 illustrates a multi-function device that can include or be connected to a software application 400 that will produce an item to the printed. A controller 402 is used as a rendering engine which references lookup tables (LUTs), half-tone (HT), etc. to produce binary data 404 to be printed. Being a multi-function device, the printing device includes a scanner 406 and a filtering element 408 which performs filtering, segmenting, error diffusing, dot clustering and similar functions to produce binary data 410 to be printed. After the binary data is obtained, it is processed through a skew correction unit 412 which alters the data before sending it to the raster output scanner 414 so that the image appears without skew on the printed page.

More specifically, the skew correction unit 412 operates differently depending upon whether the printing device is operating as a printer, a platen-based copier, or a document handler-based copier. Thus, when the printing device is in printer mode, the image is rotated the opposite direction of the ROS skew (Corr=−S (ROS)). When operating in copy platen mode, the image is rotated in the opposite direction of the ROS skew and the scanner skew (Corr =−(S (ROS)+S (Scanner))). When copying in DADH mode, the image is rotated in the opposite direction of ROS skew, scanner skew, and DADH skew (Corr =−(S(ROS)+S(Scanner)+S(DADH)).

Thus, embodiments herein examine the printed test page in different directions and through the different devices of a multi-function printer/copier in order to individually detect and isolate the skew caused by the raster output scanner, the paper path, the input scanner, and the document handler. By isolating the different causes of document skew, different forms of skew correction can be applied depending upon the operating mode (printer, copier, etc.) of the multi-function device. This enhances the skew correction ability of the multi-function device and increases user satisfaction.

It will be appreciated that the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method comprising:

printing a test document using a multi-function printing device to produce a printed document;

examining said printed document in a first direction to determine a first skew of said printing device, wherein said first skew comprises a combination of raster output scanner skew and media path skew;

examining said printed document in a second direction to determine a second skew comprising said media path skew of said printing device;

subtracting said second skew from said first skew to calculate said raster output scanner skew of said printing device;

copying said test document from a platen of said printing device to produce a platen copy of said document;

examining said platen copy to determine a third skew of said printing device, wherein said third skew comprises a combination of raster output scanner skew, media path skew, and scanner image bar skew; and subtracting said first skew from said third skew to calculate said scanner image bar skew of said printing device.

2. The method according to claim 1, further comprising performing image rotation corrections to compensate for said raster output scanner skew, said media path skew, and said scanner image bar skew, when printing images with said printing device.

3. The method according to claim 1, further comprising performing different skew corrections depending upon a type of printing operation being performed by said printing device.

4. The method according to claim 1, wherein said test document comprises markings indicating a vertical and horizontal alignment of said test document.

5. The method according to claim 1, wherein said examining of said printed document in said first direction and said examining of said printed document in said second direction each comprise scanning said printed document and comparing positions of markings on said printed document, and wherein said examining of said platen copy of said document comprises scanning said platen copy of said document and comparing positions of markings on said platen copy of said document.

6. A method comprising:

printing a test document using a multi-function printing device to produce a printed document;

examining said printed document in a first direction to determine a first skew of said printing device, wherein said first skew comprises a combination of raster output scanner skew and media path skew;

examining said printed document in a second direction to determine a second skew comprising said media path skew of said printing device;

subtracting said second skew from said first skew to calculate said raster output scanner skew of said printing device;

copying said test document from a platen of said printing device to produce a platen copy of said document;

examining said platen copy to determine a third skew of said printing device, wherein said third skew comprises a combination of raster output scanner skew, media path skew, and scanner image bar skew;

subtracting said first skew from said third skew to calculate said scanner image bar skew of said printing device;

copying said test document from a document handler of said printing device to produce a document handler copy of said document;

examining said document handler copy to determine a fourth skew of said printing device, wherein said fourth skew comprises a combination of raster output scanner skew, media path skew, scanner image bar skew, and document handler skew; and subtracting said third skew from said fourth skew to calculate said document handler skew of said printing device.

7. The method according to claim 6, further comprising performing image rotation corrections to compensate for said raster output scanner skew, said media path skew, said scanner image bar skew, and said document handler skew, when printing images with said printing device.

8. The method according to claim 6, further comprising performing different skew corrections depending upon a type of printing operation being performed by said printing device.

9. The method according to claim 6, wherein said test document comprises markings indicating a vertical and horizontal alignment of said test document.

10. The method according to claim 6, wherein said examining of said printed document in said first direction and said examining of said printed document in said second direction each comprise scanning said printed document and comparing positions of markings on said printed document, wherein said examining of said platen copy of said document comprises scanning said platen copy of said document and comparing positions of markings on said platen copy of said document, and wherein said examining of said document handler copy of said document comprises scanning said document handler copy of said document and comparing positions of markings on said document handler copy of said document.

* * * * *